UNITED STATES PATENT OFFICE.

ADOLF BAEYER, OF MUNICH, GERMANY.

MANUFACTURE OF ARTIFICIAL INDIGO.

SPECIFICATION forming part of Letters Patent No. 227,470, dated May 11, 1880.

Application filed April 6, 1880. (No specimens.)

*To all whom it may concern:*

Be it known that I, ADOLF BAEYER, a subject of the King of Bavaria, residing at Munich, in the Kingdom of Bavaria and Empire of Germany, have invented a new and useful Improvement in the Manufacture of Artificial Indigo, of which the following is a specification.

This invention relates to the synthetical formation of indigo-blue and allied coloring-matters, which I shall designate hereinafter with the general name of "artificial indigo."

The coloring-matters belonging to the chemical group of which indigo-blue may be considered the chief representative are principally characterized by their peculiar molecular arrangement, which may be defined as being built up by the union of a molecule of benzine, an atom of nitrogen, and a side chain containing two atoms of carbon, both the side chain and the nitrogen being fixed in the benzine residue and relatively to each other in the ortho position.

Now, the essential feature of my invention consists in the discovery that the said molecular arrangement may be arrived at by the mutual action of both the side chain and the nitro group in certain derivatives of orthonitrocinnamic acid. The said derivatives are, principally, orthonitrophenyloxyacrylic acid and orthonitrophenylpropiolic acid and their homologues and substitution products. The former is converted into indigo-blue by the mere action of heat. The latter requires for that purpose the action of alkalies and deoxidizing agents.

Considering that the principle of my invention consists in the synthetical construction of the above-defined molecular arrangement of artificial indigo, it is evidently of secondary importance whether and to what extent the benzine residue may have its hydrogen substituted by other elements or atomic groups. In the event of such substitution taking place in the benzine residue, theory merely allows to predict the formation of coloring-matters allied to indigo-blue and sharing its general character and chemical properties.

I now proceed to describe in what manner my invention may be carried into effect: Artificial indigo is formed whenever orthonitrophenyloxyacrylic acid is carefully heated to a temperature of about 110° centigrade. The acid fuses, swells up by a disengagement of gas, and gradually turns blue. The operation is at an end when the color no longer increases in intensity. The secondary products of decomposition may afterward be removed by the application of suitable solvents—such, for instance, as alcohol—and the insoluble residue of artificial indigo may then be further purified by the ordinary means in use for the refining of indigo.

Another process for the preparation of artificial indigo is based upon the action of alkalies and deoxidizing agents upon orthonitrophenylpropiolic acid, its homologues and substitution compounds—such, for instance, as orthonitroparachlorophenylpropiolic acid.

In order to prepare artificial indigo by the said process, orthonitrophenylpropiolic acid, or any mixture or compound containing the same, is mixed with suitable deoxidizing agents —such, for example, as glucose or milk sugar— and with a solution of caustic or carbonate alkalies or of alkaline earths.

The said mixture, upon being gradually heated to a temperature of about 100° centigrade, quickly assumes a blue color, which gradually increases in intensity owing to the formation of indigo-blue in its crystallized condition. The operation is at an end if a filtered portion of the mixture no longer yields any indigo-blue upon the application of heat and upon the addition of a further supply of the deoxidizing agent.

I may also remark that the same reactions take place by employing orthonitrophenylpropiolic acid not only ready formed, but likewise in its nascent condition. Any mixture, therefore, capable of producing orthonitrophenylpropiolic acid may be used for the preparation of artificial indigo by submitting it to the action of alkaline substances and deoxidizing agents, substantially in the manner above described. For example, artificial indigo may be produced in one operation and without separation of the intermediate products by submitting orthonitrodibromohydrocinnamic acid first to the action of alcoholic potash and then to the deoxidizing action of glucose. And I may further remark that the synthetical formation of artificial indigo may be started irrespective of the medium or place wherever the said deoxidizing action can be brought to bear upon orthonitrophenylpropiolic acid, or upon the substances capable of producing the same.

The characteristics of artificial indigo prepared according to my invention are the following: Of the group of coloring-matters which are the results of my above-described processes indigo-blue may be considered the chief representative. According to the degree of its chemical separation from the other results of my process artificial indigo possesses properties more or less identical with or different from the well-known properties of natural indigo-blue—that is to say, the group of coloring-matters extracted from the indigo-plant.

Natural indigo differs from artificial indigo chiefly in that respect, that the former is accompanied by coloring-matters and organic compounds adherent to it from its vegetal origin, while artificial indigo is indigo-blue more or less modified by coloring-matters and organic compounds which are derived from the homologues or substitution products of cinnamic acid, or from secondary reactions taking place in my described process.

I do not claim in this application the process for producing artificial indigo by the action of heat upon orthonitrophenyloxyacrylic acid, such forming the subject-matter of a separate application for a patent.

What I claim as new, and desire to secure by Letters Patent, is—

1. As a new manufacture, the dye-stuff or coloring-matter designated "artificial indigo," produced, substantially as above described, by the action of an alkali and a deoxidizing agent upon orthonitrophenylpropiolic acid, or by any other means which will produce a like result.

2. The within-described process for the production of artificial indigo by the action of an alkali and a deoxidizing agent, such as glucose, upon orthonitrophenylpropiolic acid, substantially as set forth.

In testimony that I claim the foregoing I have hereunto set my hand and seal this 24th day of March, 1880.

ADOLF BAEYER. [L. S.]

Witnesses:
GUSTAV SIEGLE,
HEINRICH CARO.